US005811885A

United States Patent [19]

Griessbach

[11] Patent Number: 5,811,885

[45] Date of Patent: Sep. 22, 1998

[54] PROCESS FOR CONTROLLING THE USE OF A MOTOR VEHICLE USING A TWO PART CODE SIGNAL

[75] Inventor: Robert Griessbach, Hoehenkirchen-Siegertsbrunn, Germany

[73] Assignee: Bayerische Motoren Werke AG, Munich, Germany

[21] Appl. No.: 413,723

[22] Filed: Mar. 31, 1995

[30] Foreign Application Priority Data

Mar. 31, 1994 [DE] Germany .......................... 44 11 435.4

[51] Int. Cl.[6] .................................................... B60R 25/00

[52] U.S. Cl. ....................... 307/10.2; 307/10.3; 307/10.4; 307/10.5; 340/426; 340/825.31; 340/825.69; 340/825.72; 235/382; 235/382.5

[58] Field of Search .................................... 307/9.1–10.8; 235/380, 382, 382.5; 340/425.5, 426, 428, 430, 825.72, 825.31, 825.69; 180/287; 380/23; 701/36, 2

[56] References Cited

U.S. PATENT DOCUMENTS

| | | | |
|---|---|---|---|
| 4,209,782 | 6/1980 | Donath et al. | 235/382.5 |
| 5,055,701 | 10/1991 | Takeuchi | 307/10.2 |
| 5,159,329 | 10/1992 | Lindmayer | 307/10.1 |
| 5,191,610 | 3/1993 | Hill | 380/23 |
| 5,280,267 | 1/1994 | Reggiani | 180/287 |
| 5,420,925 | 5/1995 | Michaels | 380/23 |
| 5,442,341 | 8/1995 | Lambropoulos | 340/825.69 |
| 5,473,200 | 12/1995 | Woo | 307/10.2 |
| 5,508,692 | 4/1996 | Wolfram | 340/825.31 |

FOREIGN PATENT DOCUMENTS

| | | |
|---|---|---|
| 0 372 285 | 6/1990 | European Pat. Off. . |
| 29 28 913 | 3/1988 | Germany . |
| 39 27 024 | 2/1990 | Germany . |
| 42 05 567 | 8/1993 | Germany . |

*Primary Examiner*—William M. Shoop, Jr.
*Assistant Examiner*—Peter Ganjian
*Attorney, Agent, or Firm*—Evenson, McKeown, Edwards & Lenahan, P.L.L.C.

[57] ABSTRACT

A process for controlling the use of a motor vehicle is provided using a code signal having two parts which is contained in a code memory carried by the user. A code comparator is contained in the motor vehicle into which the code signal is fed and which, if this code signal corresponds to a reference code signal, releases the use of the motor vehicle. The code memory has an access control device which can be controlled by the code comparator and which in each case releases only a partial code signal for a reading operation. This release takes place only if the first read partial code signal corresponds to the corresponding reference partial code signal.

10 Claims, 3 Drawing Sheets

PROCESS FOR CONTROLLING THE USE OF A MOTOR VEHICLE USING A TWO PART CODE SIGNAL

BACKGROUND AND SUMMARY OF THE INVENTION

This invention relates to a process for controlling the use of a motor vehicle using a two part code signal contained in a code memory carried by the user.

From German Patent document 29 28 913, it is basically known to construct a code signal in two parts. In this case, the two partial code signals can, as a rule, be read without any special safety measures. This presents a problem in that the content of the code signal can be copied in an unauthorized manner, and it therefore becomes possible for an unauthorized person to use the motor vehicle.

Although attempts have been made to combat this danger by changing at least one partial code signal during each use of the motor vehicle and by copying the code signal relevant to the last use of the motor vehicle, because of the changed code signal relevant to the next use, there is no possibility of using the motor vehicle by means of the "old" code signal. This solution, on the one hand, requires high expenditures because it requires a synchronization of the code change in the code memory and in the code comparator. If it is possible, for example, to simulate a use operation for the code memory and to change the code signal correspondingly, problems may occur during synchronization.

In principle, it is also disadvantageously possible to determine the algorithm which is used as a rule for changing the code signal, and then to draw a conclusion from the code signal valid during the last use on the code expected for the next use.

There is therefore needed a process of the above-mentioned type which, by simple means, improves the safety when a motor vehicle is used.

This need is met according to the present invention which provides a process for controlling the use of a motor vehicle by means of a code signal which consists of two parts and which is contained in a code memory carried by the user. A code comparator, i.e., a code control unit, is contained in the motor vehicle into which the code signal is fed. If this code signal corresponds to a reference code signal, the code control unit releases the use of the motor vehicle. The code memory has an access control device which is controlled by the code control unit and which in each case releases only a partial code signal for a reading operation. This release takes place only if the first read partial code signal corresponds to a corresponding reference partial code signal.

Of the two partial code signals, only one partial code signal respectively can be read. Even if the code memory were to fall into the hands of an unauthorized person, the second partial code signal cannot be read because this reading is possible only through the code control unit in a controlled manner. It is a prerequisite in this case that the code control unit recognizes the coinciding with the first partial code signal. Since the two partial code signals are independent of one another, the knowledge of only one partial code signal will not supply any information on the other partial code signal. This provides an effective protection against a copying of the entire code signal.

According to the present invention, in one embodiment, the first read partial code signal is individualized in a memory-specific manner and is not changed. The achievable advantages and improvements consist of the possibility of using the motor vehicle by means of several code memories.

In another embodiment according to the invention, the second partial code signal is changed with each use of the motor vehicle. Even if it should then be possible to break the safety provided by the access control device and read the two partial code signals, it can be prevented that, following a use of the motor vehicle by the authorized user, it can be used by the unauthorized user.

In yet another embodiment of the invention, the second partial code signal is written-in during a preceding use of the motor vehicle. The change of the second partial code signal can be carried out with a large variation range. The use of a change algorithm is not required in this case, and the input of a random number is sufficient.

In still yet another embodiment, after the writing-in, the second partial code signal is read again. If it is identical with the written-in partial code signal, the first partial code signal alone is released by the access control device for reading. This provides the securing of the then changed second partial code during and after the change of the code memory content.

Other objects, advantages and novel features of the present invention will become apparent from the following detailed description of the invention when considered in conjunction with the accompanying drawings.

BRIEF DESCRIPTION OF THE DRAWING

The sole FIGURE is a flow chart illustrating the dialog between a portable code memory and a code control unit fixed to the vehicle.

DETAILED DESCRIPTION OF THE DRAWING

Figure 1A:
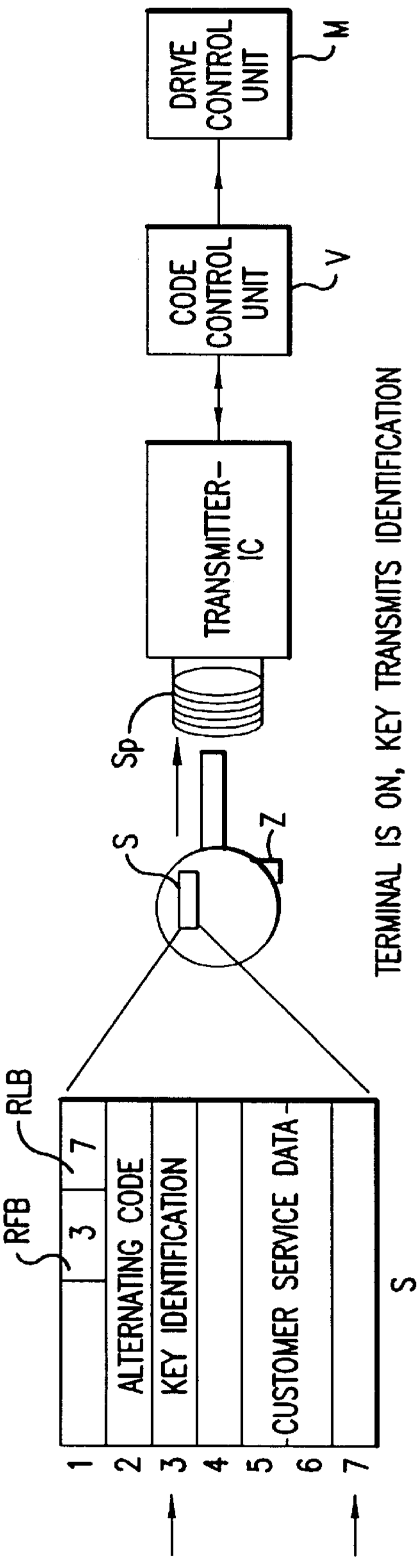

The invention is further explained by means of the drawing. In the manner of a flow chart, the drawing shows the dialog between a portable code memory and a code comparator, i.e., a code control unit as referred to herein, fixed to the vehicle. The course of this dialog illustrated in diagrams (a) to (f) preferably takes place in a wireless manner.

The code memory S is disposed in a portable housing Z, such as an ignition key. It has a block structure, as known in principle from German Patent document DE 42 05 567 A1. Of the blocks marked with numbers 1 to 7, only blocks 1 to 3 are of interest within the scope of the invention. Block 1 is part of an access control device ACD for blocks 1 to 7 which is provided by a microprocessor ($\mu$P) in the housing Z (shown only in FIG. 1(*b*) for simplification). The microprocessor interacts with the memory S. The access control device operates in accordance with indicator RFB for the number of the first readable memory block and by RLB for the number of the last-readable memory block. In addition, access to the access control device may be protected by a password. It is important that the access control device can only be controlled by a code control unit V provided or contained in the motor vehicle. The code control unit V is not shown in detail. It is disposed in the motor vehicle and receives the contents of the memory blocks which can be read out of the memory S.

The dialog, which will be explained in the following and by means of diagrams a to f, is to take place, for example, when the mechanical ignition key is inserted and operated in an ignition lock. However, it is just as easily possible to carry out this dialog in a supplementary manner or as a replacement when the motor vehicle is unlocked. For this purpose, the memory S is situated in an ignition key Z which is introduced into a lock which is not shown and, in the process, triggers an inquiry by the code comparator V. The dialog preferably takes place in a wireless manner by means of a coil Sp which is controlled by a transmitter-IC.

The first partial code signal contained in block 3 is read out first (FIG. 1*a*) and is fed into the code control unit V by way of the coil Sp. The indicator RFB contains the designation of the first block 3 which can be read out from the memory S. This first partial code signal contains information which can be individualized for a particular memory S or for a particular key Z. This information is not changed thereafter. This allows the code control unit V to recognize one of several authorized users by means of the key identification contained in block 3.

Figure 1B:
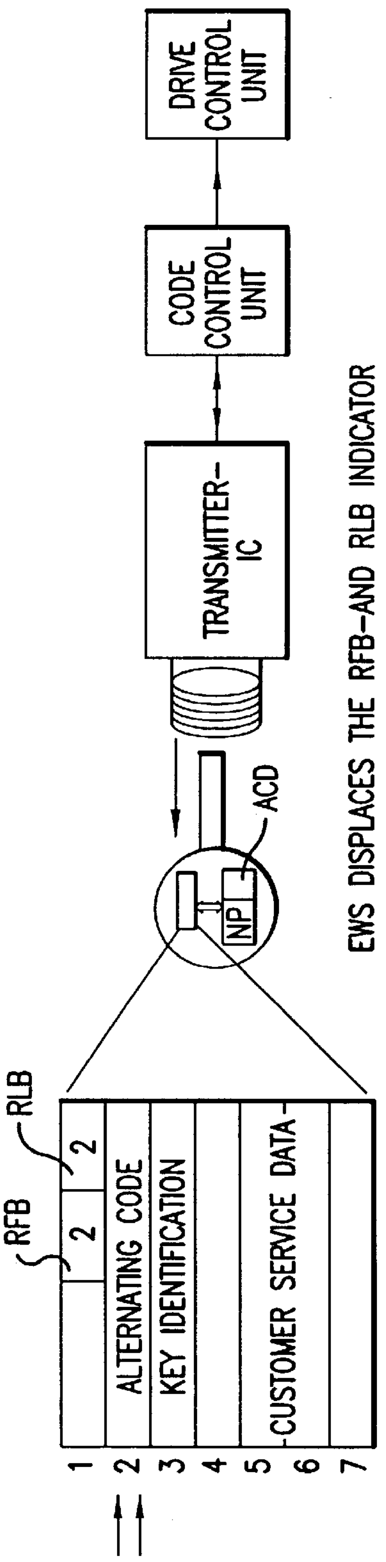
Figure 1C:
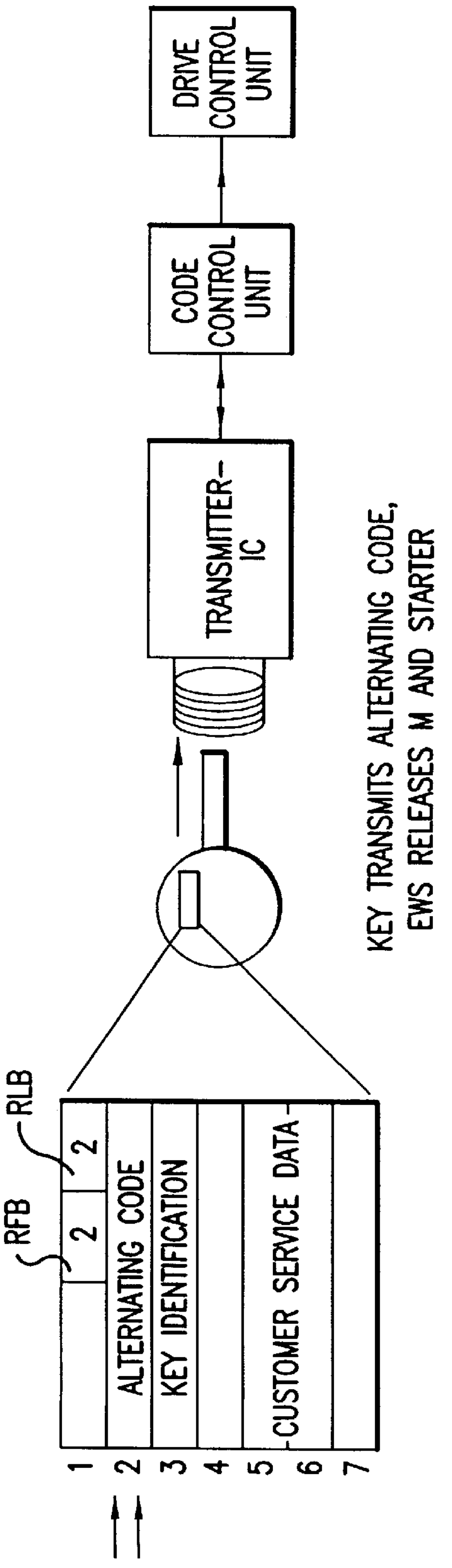

If the first partial code signal corresponds to the reference partial code signal which exists in the code control unit V and is expected by it, the code control unit V will control the indicators RFB and RLB (block 1) in the manner shown in FIG. 1*b* by way of the transmitter-IC and the coil Sp. The information RFB and RLB therefore indicates only block 2 which can be read alone.

The information contained in block 2 represents the second partial code signal which is now read and is compared in the comparator V (FIG. 1*c*) with the corresponding reference partial code signal. If these also coincide, that is, if the entire code signal formed of the two partial code signals is identical with the expected code signal, the code control unit releases a drive control unit M.

Subsequently, the code control unit V writes back a new second partial code signal. This may be a random number. This number reaches the memory S via the path indicated by an arrow and is stored as a new alternate code in block 2 of the memory S. This operation is illustrated in FIG. 1*d*.

Figure 1D:
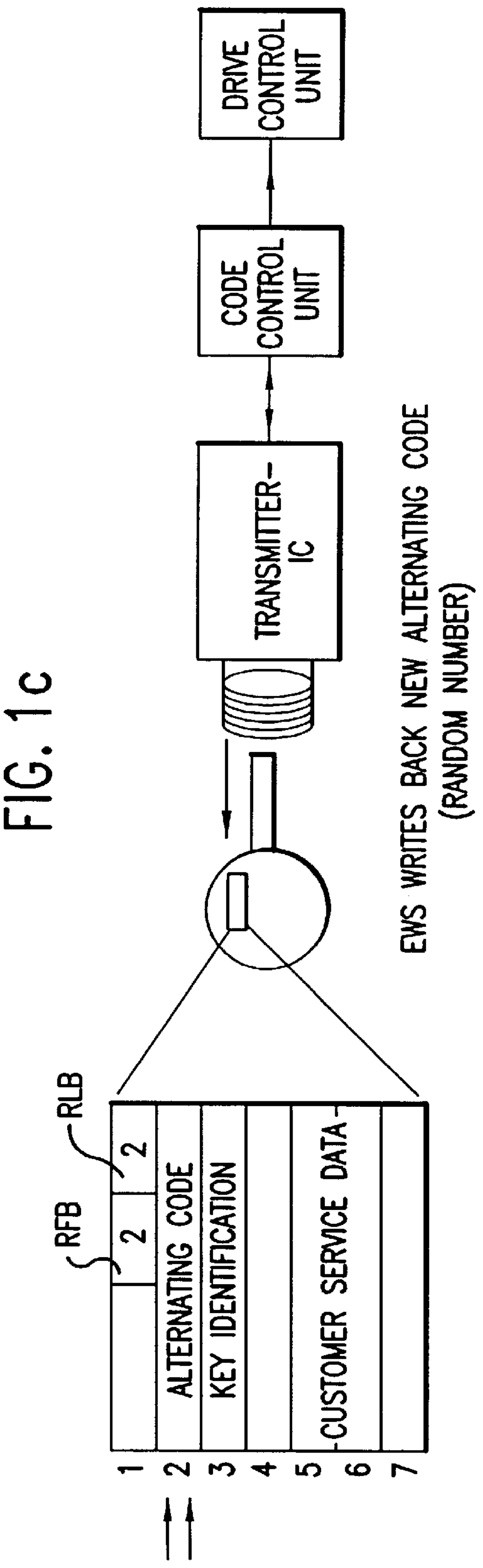
Figure 1E:
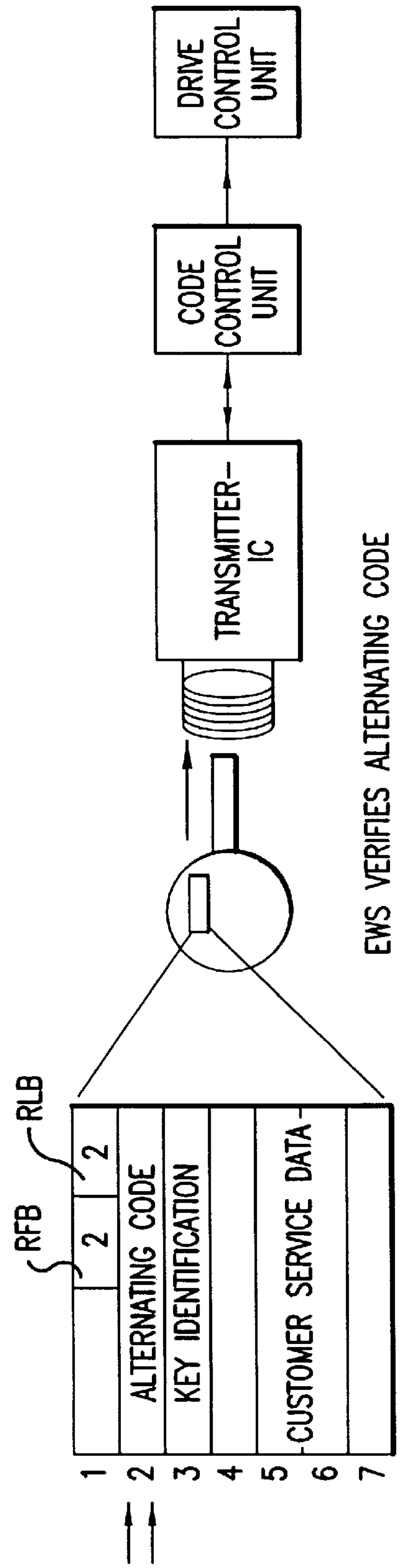
Figure 1F:
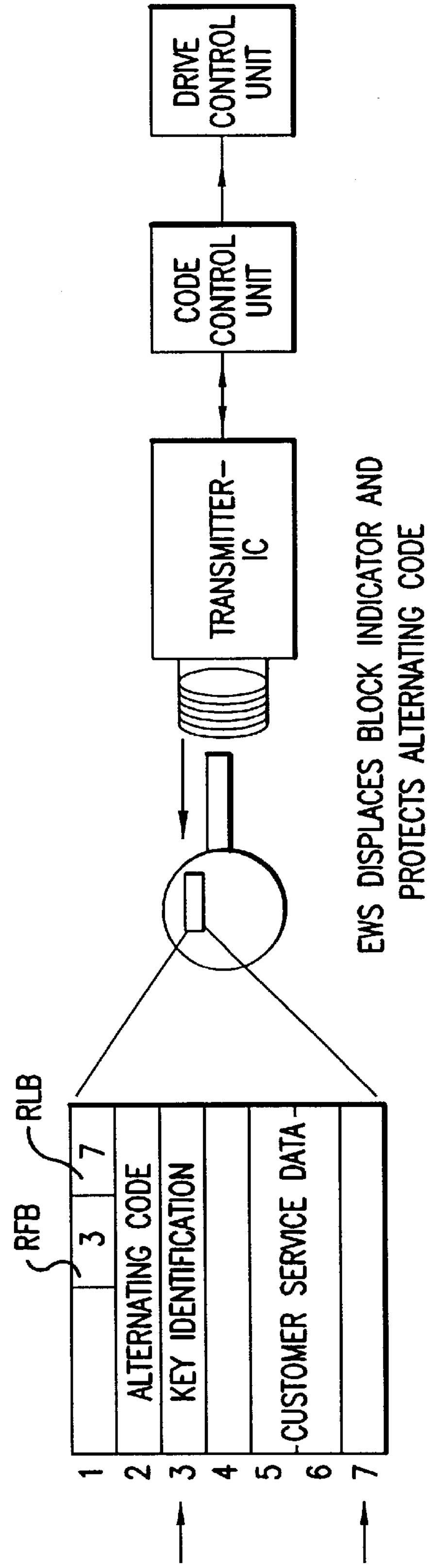

In order to ensure that the alternate code was in fact stored correctly, in the memory S it is read again and is compared in the code control unit (FIG. 1*e*) with the alternate code emitted and stored in the preceding process step (FIG. 1*d*). If the alternate code is identical, the code control unit V changes the content of block 1 again and the original (FIG. 1*a*) existing condition is set. The information in field RFB (=3) means that now block 3 is again read first, while the content of block 2, that is, the alternate code is protected from access.

Therefore, the content of the memory S in step (f) differs from that in step (a) with respect to the content of block 2. This content can no longer be read. On the other hand, it is changed with respect to the first (step a) existing content. The alternate code is therefore protected from being read. On the other hand, should it be possible to nevertheless "break into" the alternate code, it is ensured that, after the next use of the motor vehicle a protection is achieved against misuse as a result of the then again changed alternate code.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for controlling use of a motor vehicle using a code signal having two parts, said code signal being contained in a code memory carried by a user and being transmitted to a code control unit contained in the motor vehicle which reads the code signal, a correspondence between this code signal and a reference code signal operating to release the use of the motor vehicle, the process comprising the steps of:

transmitting an inquiry with said code control unit located in the motor vehicle to access an access control device for allowing access to the code memory;

comparing in the code control unit a first partial code signal read from said code memory with a reference partial code signal in the code control unit; and making a second partial code signal separately stored in said code memory accessible for a subsequent reading operation only if the first partial code signal read from the code memory corresponds to the reference partial code signal; and releasing the use of the motor vehicle if the second partial code signal corresponds with a corresponding reference partial code signal.

2. A process according to claim 1, further comprising the step of individualizing the first partial code signal for a particular memory, and thereafter not changing said first partial code signal.

3. A process according to claim 1, wherein the partial code signal is a second partial code signal, the process further comprising the step of changing the second partial code signal with each use of the motor vehicle.

4. A process according to claim 2, wherein the partial code signal is a second partial code signal, the process further comprising the step of changing the second partial code signal with each use of the motor vehicle.

5. A process according to claim 3, wherein the partial code signal is a second partial code signal, further comprising the step of writing-back said second partial code signal to the code memory during a preceding use of the motor vehicle.

6. A process according to claim 4, wherein the partial code signal is a second partial code signal, further comprising the step of writing-back said second partial code signal to the code memory during a preceding use of the motor vehicle.

7. A process according to claim 5, further comprising the steps of:

reading the second partial code signal after the writing-back step; and making only the first partial code signal accessible through the access control device by the code control unit for a reading operation if said second partial code signal read is identical with the written-back second partial code signal.

8. A process for controlling use of a motor vehicle using a two part code signal, the process comprising the steps of:

storing each part of the two part code signal in a different location in a code memory carried by a user;

using a code control unit contained in the motor vehicle to transmit signals for an access control device for the code memory, said access control device only allowing a second partial code signal of said two part code signal to be subsequently read from the code memory if a first partial code signal previously read from said code memory corresponds to a reference partial code signal contained in the code control unit in a comparison made in the code control unit.

9. A process for controlling use of a motor vehicle using a two part code signal, the process comprising the steps of:

storing each part of the two part code signal in a different location in a code memory carried by a user;

reading a first partial code signal from said code memory with an access control device which is controlled by a code control unit located in the motor vehicle;

comparing in the code control unit in the motor vehicle the first partial code signal read from said code memory with a reference partial code signal in the code control unit; and allowing a second partial code signal to be read from the code memory only in response to a signal from the code control unit in the motor vehicle if the first partial code signal corresponds to the reference partial code signal.

10. A process for controlling use of a motor vehicle using a code signal having two parts, said code signal being contained in a code memory carried by a user, the process comprising the steps of:

triggering an inquiry signal from a code control unit fixed in a motor vehicle to operate an access control device for accessing the code memory;

reading with the access control device, and transmitting to the code control unit, a first partial code signal from the code memory;

comparing in the code control unit the first partial code signal with a reference partial code signal stored in the code control unit;

making a second partial code signal separately stored in said code memory accessible for a subsequent reading operation only if the first partial code signal read from the code memory corresponds to the reference partial code signal; and releasing the use of the motor vehicle if the second partial code signal corresponds with a corresponding reference partial code signal.

* * * * *